United States Patent
Park

(10) Patent No.: US 8,563,881 B2
(45) Date of Patent: Oct. 22, 2013

(54) INPUT DEVICE AND ELECTRONIC APPARATUS HAVING THE SAME

(75) Inventor: Bum-su Park, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 905 days.

(21) Appl. No.: 11/938,925

(22) Filed: Nov. 13, 2007

(65) Prior Publication Data

US 2008/0291058 A1   Nov. 27, 2008

(30) Foreign Application Priority Data

May 23, 2007   (KR) .................. 10-2007-0050335

(51) Int. Cl.
*H01H 13/70* (2006.01)

(52) U.S. Cl.
USPC .......................................... 200/5 A; 341/22

(58) Field of Classification Search
USPC .......... 200/5 A, 302.1, 302.2, 341–345, 517;
400/472, 485–490; 341/20, 22;
345/156, 160, 168, 169
See application file for complete search history.

(56) References Cited

U.S. PATENT DOCUMENTS

| | | | |
|---|---|---|---|
| 5,329,278 A * | 7/1994 | Dombroski | 341/20 |
| 5,360,955 A * | 11/1994 | English et al. | 200/5 A |
| 5,673,040 A * | 9/1997 | Hargreaves et al. | 341/22 |
| 5,703,626 A | 12/1997 | Itoh et al. | |
| 6,278,442 B1 | 8/2001 | Griffin et al. | |
| 6,580,932 B1 | 6/2003 | Finke-Anlauff | |
| 7,087,850 B1 * | 8/2006 | Murzanski | 200/302.1 |
| 7,129,433 B2 * | 10/2006 | Tokusashi | 200/344 |
| 7,224,345 B2 | 5/2007 | Kawell et al. | |
| 7,778,672 B2 | 8/2010 | Imazaki et al. | |
| 2005/0156903 A1 | 7/2005 | Kawell et al. | |
| 2007/0030249 A1 | 2/2007 | Griffin et al. | |

FOREIGN PATENT DOCUMENTS

| | | |
|---|---|---|
| JP | 2001-125708 | 5/2001 |
| KR | 20060044604 | 5/2006 |

OTHER PUBLICATIONS

Chinese Office Action issued Aug. 15, 2011 in CN Application No. 200810092339.3.
Advisory Action issued Jan. 6, 2011 in U.S. Appl. No. 11/739,810.
United States Office Action issued Sep. 30, 2010 in U.S. Appl. No. 11/739,810.
United States Office Action issued Apr. 26, 2010 in U.S. Appl. No. 11/739,810.
Korean Office Action dated Jun. 19, 2013 issued in KR Application No. 10-2007-0007659.
Korean Office Action dated Jul. 26, 2013 issued in KR Application No. 10-2007-0050335.

* cited by examiner

*Primary Examiner* — Amy Cohen Johnson
*Assistant Examiner* — Marina Fishman
(74) *Attorney, Agent, or Firm* — Stanzione & Kim, LLP

(57) ABSTRACT

An input device and an electronic apparatus having the same are provided. The input device includes a main body, and a plurality of keys each having a contact part which contacts a pressing unit and a non-contact part which extends from the contact part and is spaced apart from the pressing unit. The contact parts and the non-contact parts of the keys may be arranged in a zigzag pattern. The electronic apparatus includes the above-mentioned input device and a display device which is provided in the main body.

17 Claims, 11 Drawing Sheets

INPUT DEVICE AND ELECTRONIC APPARATUS HAVING THE SAME

CROSS-REFERENCE TO RELATED APPLICATIONS

This application claims priority from Korean Patent Application No. 10-2007-0050335, filed on May 23, 2007 in the Korean Intellectual Property Office, the disclosure of which is incorporated herein by reference.

BACKGROUND OF THE INVENTION

1. Field of the Invention

Apparatuses consistent with the present general inventive concept relate to an input device and an electronic apparatus having the same, and more particularly, to an input device which has an improved input unit and an electronic apparatus having the same.

2. Description of the Related Art

In general, a user inputs information to various electronic apparatuses through an input device. Herein, a portable information processing apparatus will be described as an example of the electronic apparatus for the sake of convenience.

The portable information processing apparatus may be a portable computer, an MP3 player, a personal digital assistant (PDA), a cellular phone, an electronic frame, a portable multimedia player (PMP), etc. The portable information processing apparatus processes various information and is conveniently used in daily life. An ultra mobile personal computer (UMPC) is relatively light in weight, relatively small in size and has various functions and will be described as one example of a portable computer.

The ultra mobile personal computer is a kind of information processing apparatus and functions as a notebook computer, a tablet personal computer, a navigation system, a portable storage device, a portable multimedia player (PMP), a personal digital assistant (PDA), and/or a digital multimedia broadcasting player. The ultra mobile personal computer allows a user to input and output information or the like anytime and anywhere.

Thus, the ultra mobile personal computer is in need of an input device to allow a user to effectively and easily input information, data or the like while being moved by the user.

SUMMARY OF THE INVENTION

The present general inventive concept provides an input device which can prevent or reduce a mistakes by a user and enhance the convenience to the user, and an electronic apparatus having the same.

The present general inventive concept also provides an input device which can minimize or reduce a user's movement during input, and an electronic apparatus having the same.

The present general inventive concept also provides an input device which can be slim in appearance, and an electronic apparatus having the same.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing an input device including a main body, and a plurality of keys each comprising a contact part which contacts a pressing unit and a non-contact part which extends from the contact part and is spaced apart from the pressing unit.

The contact parts and the non-contact parts of the keys each may be arranged in a zigzag pattern.

The contact parts and the non-contact parts may be alternately arranged in a row direction of the main body.

The contact parts and the non-contact parts may be alternately arranged in a column direction of the main body.

The input contact part may have a protruding shape, and the non-contact part may have a recessed shape.

The contact part of the key which is pressed by the pressing unit may have a height greater than the heights of the non-contact parts of the neighboring keys disposed adjacent thereto.

The input device may further include a key input unit including at least one horizontal key group which comprises the plurality of keys disposed in the main body.

The main body may have a reference line extending in a horizontal direction on a planar surface thereof, and an angle between the reference line and an extension line extending across the same points of the respective keys of the horizontal key group may be varied for each horizontal key group from the lower part of the main body to the upper part of the main body.

The angle may be increased or decreased from the lower part of the main body to the upper part of the main body. Alternatively, the angle may be increased and then decreased, or vice versa, from the lower part of the main body to the upper part of the main body.

The foregoing and/or other aspects and utilities of the present general inventive concept can be also achieved by providing an electronic apparatus including one of the above-mentioned input devices, and a display device which is provided in the main body.

The foregoing and/or other aspects and utilities of the present general inventive concept can be also achieved by providing an input device comprising a plurality of keys arranged in at least one row, each key adapted to receive a force on a respective upper pressing surface to input information when a component of the force along a first direction exceeds a certain level, wherein for each key, a cross section of the key parallel to the first direction and perpendicular to a direction of the row in which the key is arranged includes an upper profile which is asymmetric.

The foregoing and/or other aspects and utilities of the present general inventive concept can be also achieved by providing an input device comprising a plurality of keys arranged in at least one row, each key adapted to be pressed to input data when a force component received along a first direction exceeds a certain level, wherein with respect to a top down view of each key in the first direction, each key includes a first and second surfaces on opposite sides of a line intersecting a center of the key and extending in the row direction, and wherein the average height in the first direction of the first surface is different from the average height in the first direction of the second surface.

The foregoing and/or other aspects and utilities of the present general inventive concept can be also achieved by providing an input device comprising a key including an upper surface, wherein a majority part of the upper surface is shaped substantially as a stair.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
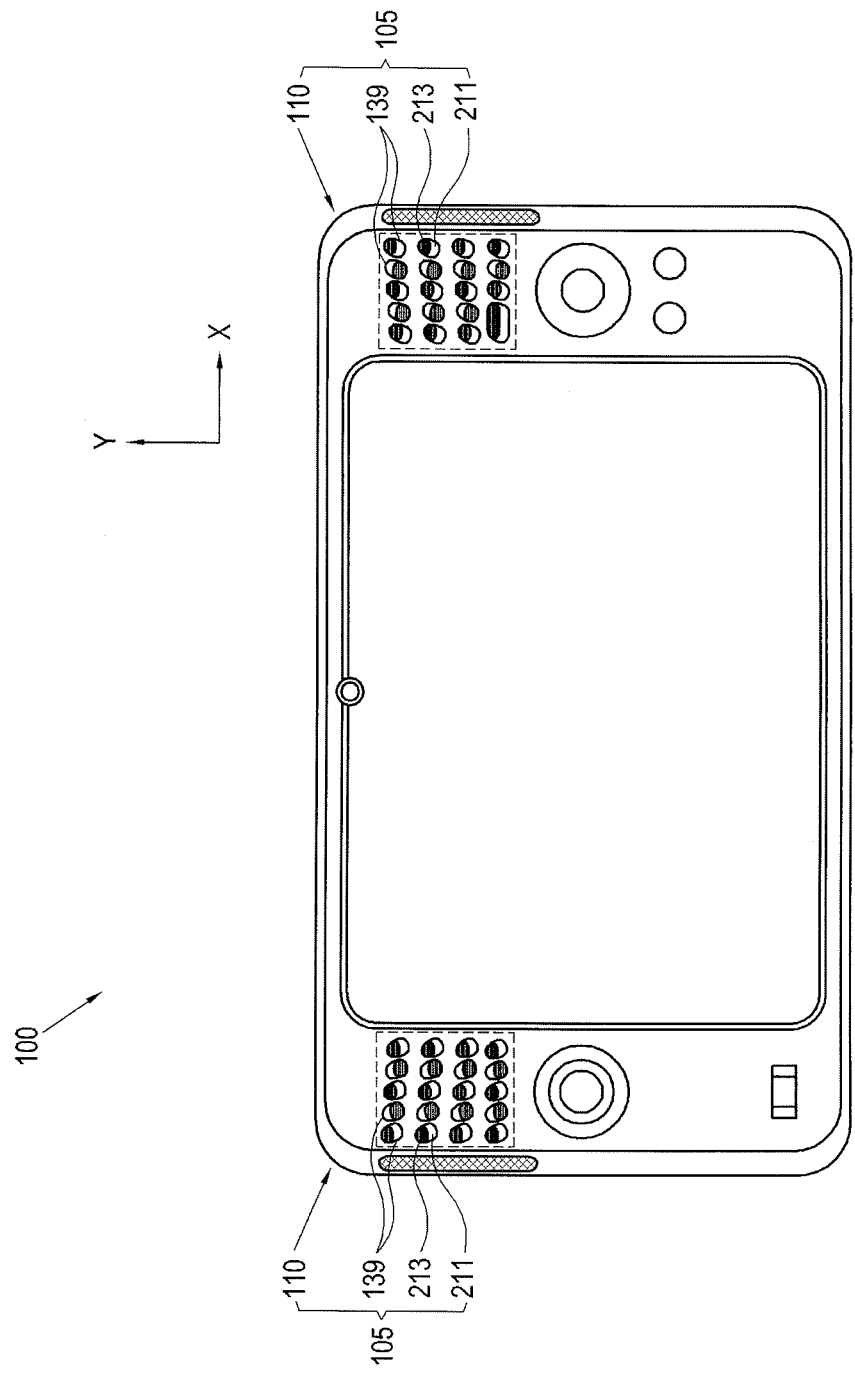
FIG. 1 is a front view of an input device according to an exemplary embodiment of the present general inventive concept.
Figure 2:
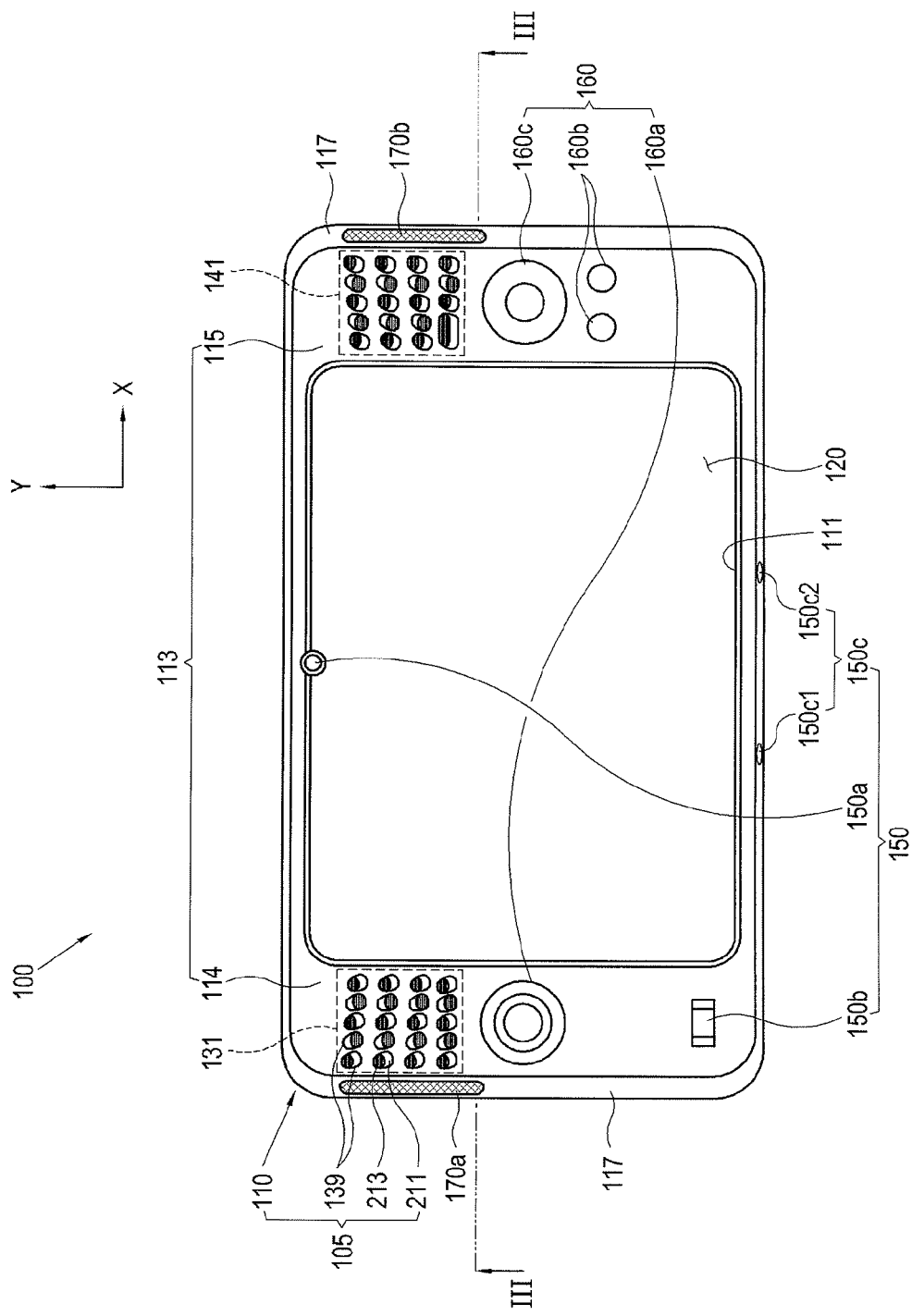
FIG. 2 is a front view of a portable computer according to an exemplary embodiment of the present general inventive concept, having the input device in FIG. 1.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

An ultra mobile personal computer (UMPC) which is a kind of a portable computer as well as a kind of portable information processing apparatus will be described as an example of an electronic apparatus according to the present general inventive concept. The present general inventive concept is also applicable to other electronic devices including various portable information processing apparatuses such as a portable multimedia player (PMP), a personal digital assistant (PDA), etc.

As illustrated in FIGS. 1 through 9, an input device 105 according to an exemplary embodiment of the present general inventive concept includes a main body 110 and a key 139 having a contact part 211 and a non-contact part 213.

A portable computer 100 according to an exemplary embodiment includes the input device 105 and a display unit 120. The portable computer 100 may further include an additional input unit 150, a function input unit 160, and a controller 180. The portable computer 100 may be connected to an external keyboard (not shown), etc.

Herein, the key 139 may refer to a single key 139 or a plurality of keys 139.

Also, the reference number of each element may be used with a suffix. For example, if a particular one of the plurality of keys 139 is to be described, the reference labels may be one of "139a" through "139e." The main body 110 generally forms an external appearance of the input device and the portable computer 100, and has a display opening 111 in a center area thereof through which the display unit 120 is exposed. The main body 110 includes a front panel 113 in a front part thereof. Also, the main body 110 may include a supporting bracket 119 provided on a rear part thereof so as to be supported on an installation surface such as a desk, etc. if the main body 110 is supported on the installation surface. A user also may conveniently hold the portable computer 100 using the supporting bracket 119 with both hands.

The main body 110 may further include a supporting stand (not shown) which rotates so that the main body 110 can be supported on the installation surface in an inclined fashion. The supporting stand may be accommodated to the rear part of the main body 110.

The front panel 113 is provided in the front part of the main body 110. Various input units 191 and output units 193 can be disposed in the front panel 113.

A right panel part 115 of the front panel 113 is disposed beside a right side of the display opening 111. A right key group 141 and a part of the function input unit 160 are disposed on the right panel part 115.

A left panel part 114 of the front panel 113 is disposed beside a left side of the display opening 111. A left key group 131, the other part of the function input unit 160, and an information recognizing device 150b are disposed on the left panel part 114.

Figure 3:
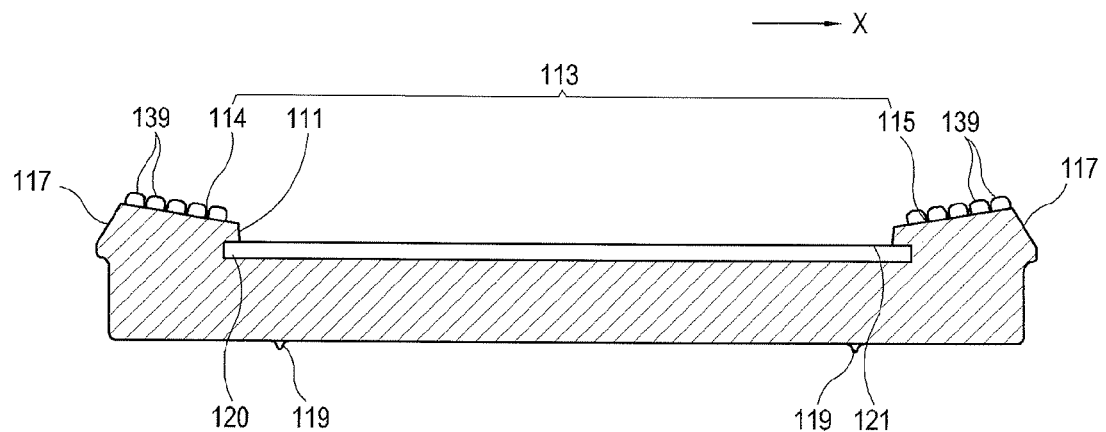
FIG. 3 is a sectional view, taken along line III-III in FIG. 2.

As illustrated in FIG. 3, the left panel part 114 and the right panel part 115 may be provided on an incline with respect to a reference surface 121 of the display unit 120. That is, each of the planar surfaces of the left panel part 114 and the right panel part 115 may be inclined with respect to the reference surface 121. Here these surfaces are inclined so that a spacing between these surfaces and a plane parallel to the reference surfaces 121 gradually increases as they extend away from the display opening 111. Alternatively, surfaces of the left panel part 114 and the right panel part 115 may be concave or convex with a predetermined curvature. Accordingly, the external appearance of the front panel 113 may be improved and the keys 139 may be effectively disposed.

A bent surface 117 extends from a right end part and a left end part of the front panel 113 toward the rear part thereof. A speaker 170 may be disposed in each bent surface 117. Accordingly, a sound generated in each speaker 170 may be effectively transmitted to the user from the respective bent surface 117. Also, space efficiency for the speaker 170 is improved, and thus, space efficiency for the front panel 113 is also improved and design limitations are reduced.

The display unit 120 displays an image through the display opening 111. The display unit 120 may include a touch screen function for input using a pen, etc. by the user. The display unit 120 is disposed in the center area of the front panel 113 and may be provided in various sizes. For example, the display unit 120 may have a size of seven inches.

The reference surface 121 coincides with the planar surface of the display unit 120. For example, the reference surface 121 may be a plane having a horizontal axis (refer to an 'X' axis in FIGS. 1 and 2) and a vertical axis (refer to a 'Y' axis in FIGS. 1 and 2) in the planar surface of the display unit 120.

Figure 7:
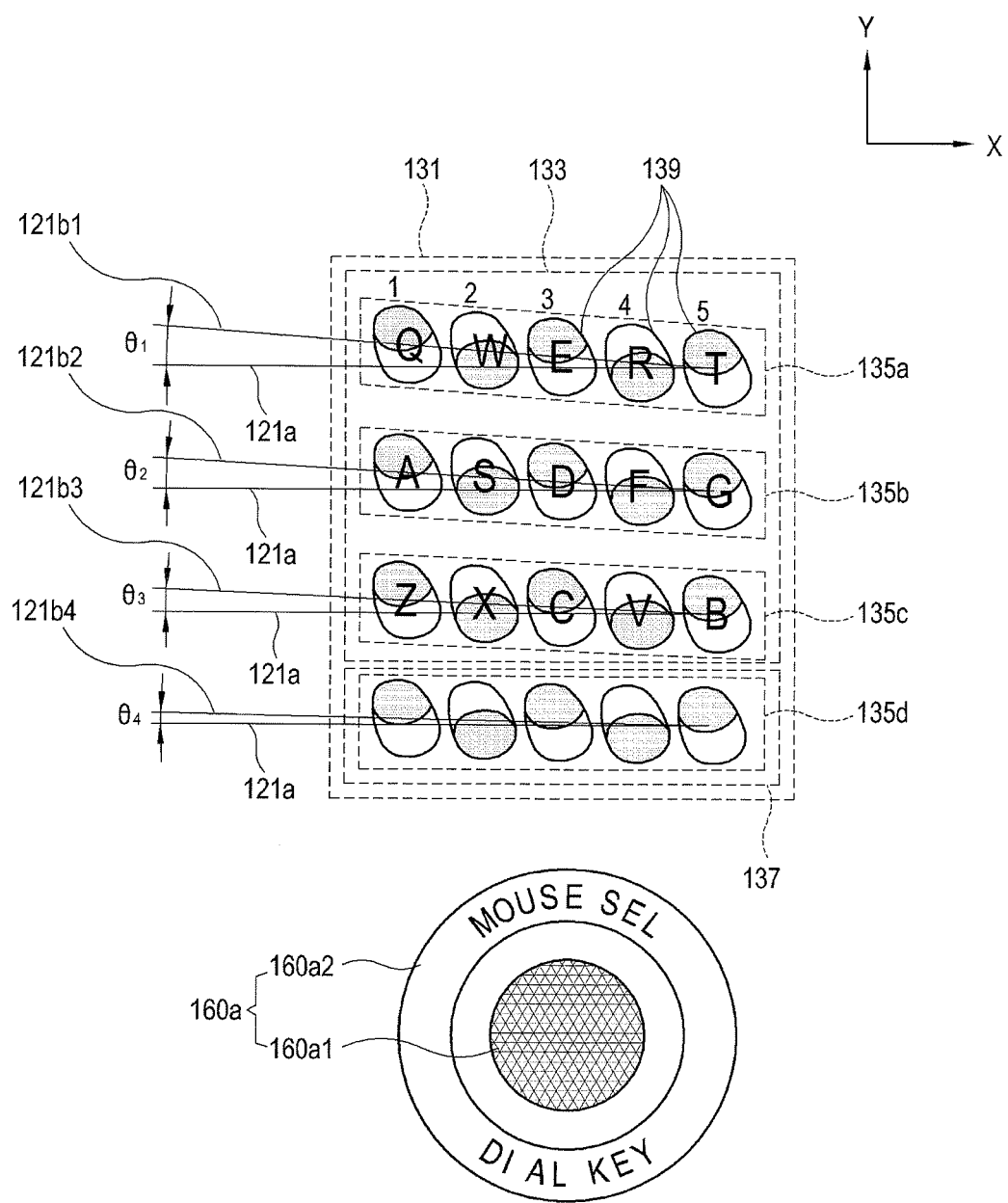
FIG. 7 is a plan view showing the left panel in FIG. 4.

As illustrated in FIG. 7, reference lines 121a extend along the reference surface 121 of the display unit 120 in the X direction.

A key input unit 130 includes a left key group 131 and a right key group 141 which are disposed in the left and the right parts 114 and 115 of the front panel 113, respectively. The key input unit 130 is part of the input unit 191, and the user may use the key input unit 130 to input a character, a symbol, etc. while holding the main body 110. The key input unit 130 may have additional various functions as desired. The left key group 131 is disposed in the left panel part 114, and includes left character input keys 133 and left symbol input keys 137.

The right key group 141 is disposed in the right panel part 115 and includes right character input keys 143 and right symbol input keys 147.

The character input keys 133 and 143 are disposed in the left key group 131 and the right key group 141, respectively. The character input keys 133 and 143 have horizontal key groups 135 and 145 including keys 139 disposed in a direction perpendicular to the opposite sides of the display opening 111. Each character input key 133 or 143 may include at least one horizontal key group 135 or 145. The character input keys 133 and 143 include the left character input key 133 and the right character input key 143. Here, it is preferable but not necessary that the character input keys 133 and 143 are disposed in the upper side of the right panel part 115 and the left panel part 114 so that the movement of the thumbs of a user can be relatively free and extensive to press the keys when the user holds the main body 110.

Figure 4:
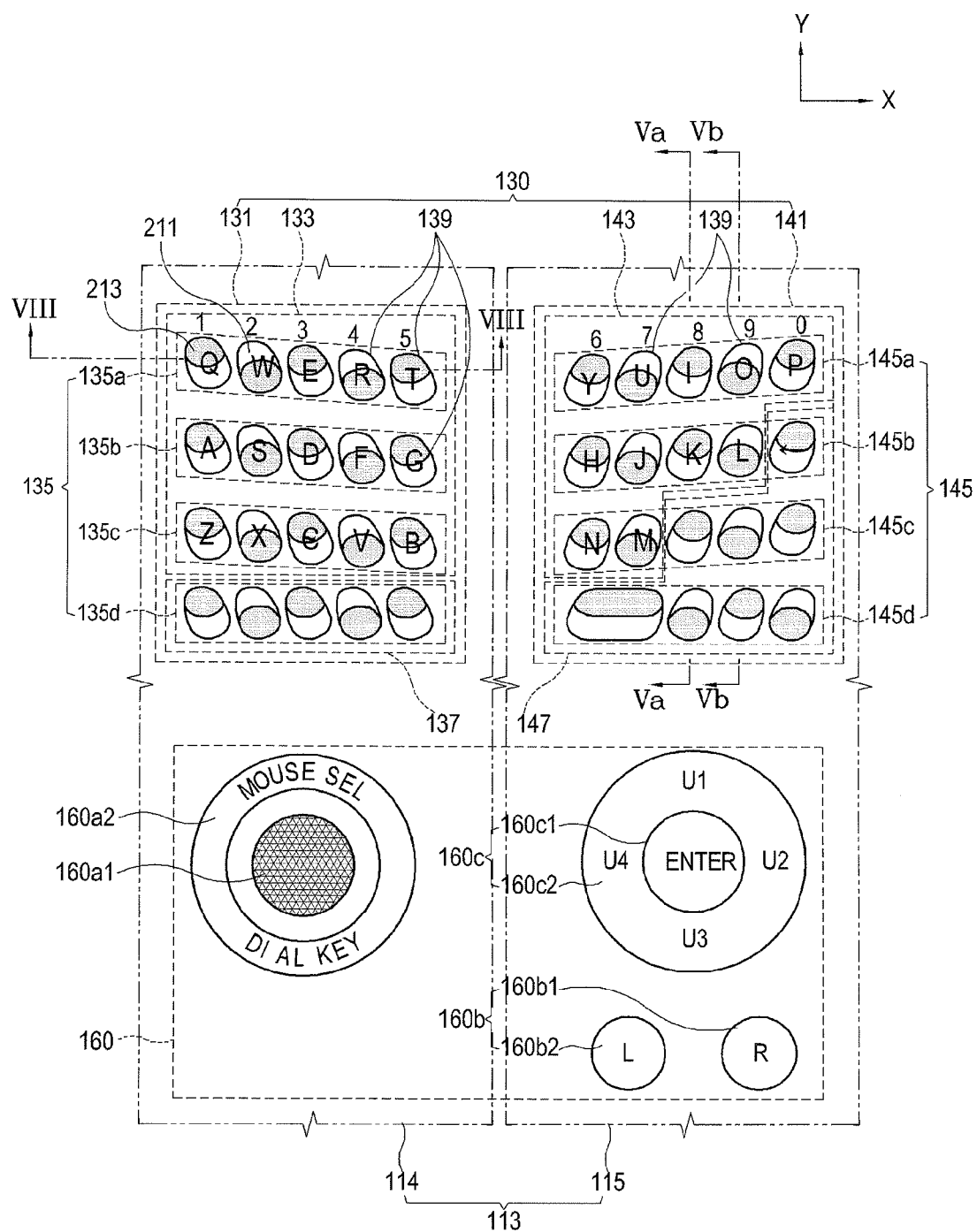
FIG. 4 is a partial sectional view illustrating a right panel part and a left panel part in FIG. 2.

Also, each of the character input keys 133 and 143 may be used to input more than one character. For example, the character input keys 133 and 143 may be used to input English alphabet using a "QWERTY" keyboard format (as illustrated in FIG. 4) as well as to input the Korean alphabet. As another example, the character input keys 133 and 143 may also or alternatively be used to input the English alphabet using a "DVORAK" keyboard format.

Each of the horizontal key groups 135a, 135b, 135c and 135d may be respectively disposed to intersect a line which is also intersected by a corresponding horizontal key group 145a, 145b, 145c and 145d. For example, keys of key groups 135a and 145a may be intersected by the same line. The horizontal key groups 135 and 145 each have a plurality of keys 139. In this example, the horizontal key groups 135 and 145 include five keys 139, but this number may be more or less.

Each of the left key group 131 and right key group 141 may include one or more horizontal key groups 135 and 145 respectively disposed along the opposite sides of the display opening. Each of left and right key groups 131 and 141 include four horizontal key groups 135 and 145 in this example, but may include five, six groups, or more, or less than four groups as desired.

The keys 139 of a horizontal key group (135 or 145) may be arranged so that a similar portion of the key 139 intersects a line (hereinafter referred to as an extension line). For example, the similar portion may be a center (with respect to either volume or area—e.g., an area as viewed top down), a top, a bottom or an upper end part of each key 139 of a key group (135 or 145). In the example of FIG. 7, an extension line 121b connects the center of the area of the keys 139 of horizontal key groups 135. An angle θ between a projection of the extension line 121b onto the reference surface 121 and a line 121a in the X direction along the reference surface 121 may be gradually increased or decreased for each horizontal key group 135 in dependence on the vertical location of the horizontal key group 135. For example, as illustrated in FIG. 7, this angle θ may be increased for each subsequent horizontal key group from the lower part to the upper part of the front panel 113.

Herein, the extension line 121b may be a straight line, a curved line or a combination thereof. In the event the extension line 121b is more than a single straight line, the angle θ may be determined based upon a projection of a straight line which approximates the extension line, for example, a straight line having a minimum deviation from the curved line (e.g, based on a sum of distances from the straight line and the above mentioned similar portions of keys 139), or a straight line which is tangential to the extension line at the same horizontal location for each horizontal key group 135.

An arrangement of the keys 139 described above will be described with reference to the example illustrated in FIG. 7. Hereinbelow, only the arrangement of keys 139 of the left key group 131 will be described for the sake of convenience because in this example the arrangement of the keys 139 of the right key group 141 is asymmetrical to those of the left key group 131.

As illustrated in FIG. 7, the horizontal key groups 135a to 135d are disposed from the upper part of the front panel 113 to the lower part thereof. Herein, the angles between the extension lines 121b1 to 121b4 of the horizontal key groups 135a to 135d and the reference lines 121a are referred to as θ1 to θ4, respectively. The extension lines 121b in this example intersect the center of the area of the keys 139 as viewed from a top down view of the keys 139. The keys 139 may be disposed so that the angle between the extension line 121b and the reference line 121a may be gradually decreased for each key group in the top to bottom direction. For the example of FIG. 7, this may be indicated as θ1>θ2>θ3>θ4.

Alternatively, keys 139 may be disposed so that the angle between the extension line 121b and the reference line 121a may be gradually increased for each key group in the top to bottom direction. For the example of FIG. 7, this would be indicated as θ1<θ2<θ3<θ4.

Alternatively, the keys 139 may be disposed so that the angle between the extension line 121b and the reference line 121a can be gradually increased and then decreased for each key group in the top to bottom direction. For the example of FIG. 7, this would be indicated as θ1<θ2<θ3>θ4 or θ1<θ2=θ3>θ4.

Thus, the keys 139 may be disposed according to the movement of a pressing unit P, for example, a thumb of a user, when the user holds the main body 110 and inputs information such as a character, etc. Accordingly, input efficiency and convenience to the user can be improved. Also, while the user inputs the information through the pressing unit P or the pressing unit P is moved, the interference of the pressing unit P and the keys 139 is minimized, thereby preventing, minimizing or reducing user errors. Further, the external appearance of the front panel 113 can be improved by the arrangement of the keys 139.

The key 139 may include a contact part 211 and the non-contact part 213. The keys 139 may be disposed in at least one of the upper side and the lower side of the front panel 113 as desired. The keys 139 may be provided with in the shape of a trapezoid with rounded corners. Alternatively, the keys 139 may be provided in other shapes including an oval.

The symbol input keys 137 and 147 may be disposed above or below the character input keys 133 and 143, and include the plurality of keys 139. The symbol input keys 137 and 147 may be included in horizontal key groups 135 and 145 in the left panel part 114 and the right panel part 115. For example, the left symbol input keys 137 include a shift key, a num lock key, a '~' key, a '@' key, and a '-' key tilted to face the display opening 111 on the left panel part 114. In this example, right symbol input keys 147 include a space key, an alt key, a '?' key, and a shift key. As illustrated in FIG. 4, the right symbol input keys 147 may further include a '←' key, an enter key, etc. as part of one or more of the horizontal key groups 145 of the right character input keys 143 in the right panel part 115.

The symbol input keys 137 and 147 may be provided in one of the left panel part 114 and the right panel part 115, and may be provided as part of one or more of the plurality of horizontal key groups 135 and 145 as necessary. Also, the size and arrangement of the symbol input keys 137 and 147 may be varied according to an expected use of the user.

The user may hold the left and the right portions of the main body 110 with both hands, and can conveniently input characters and data as done with a keyboard.

The additional input unit 150 may be disposed in the left part 114 or the right part 115, and may include additional input elements 150a, 150b, and 150c.

The additional input unit 150 may include at least one of a camera 150a, an information recognizing device 150b, and a microphone 150c.

The camera 150a may be disposed in a center area of the front panel 113, and may take a photograph of an object. Alternatively, the camera 150a may be disposed at other areas of the front panel 113 as well as within the rear part of the main body 110.

The information recognizing device 150b may be disposed in the left part 114 of the front panel 113 and to recognize information of a user. The information recognizing device 150b may include a fingerprint reader to recognize a user's fingerprint, and/or may include known various devices such as an iris reader and a retina reader, etc.

The microphone 150c may input a user's voice, etc. A pair of spaced apart microphones 150c1 and 150c2 may be disposed in the lower side of the front panel 113. The microphone 150c may include an array microphone. Accordingly, the recording of noises of unwanted sound can be minimized or reduced.

The function input unit 160 may be provided in at least one of the left part 114 and the right part 115 of the front panel 113, and may be used for various functions. The function input unit 160 includes a hall mouse 160a, a mouse function key 160b, and a function setting key 160c. The function input unit 160 may further include other keys having various functions as necessary.

The hall mouse 160a is disposed in the left part 114 of the front panel 113, and the user may select a mouse function and a multi-direction key function therethrough. The hall mouse 160a has a moving member 160a1 which is provided in the center of the hall mouse 160a and moves an icon or a pointer formed in the display unit 120, and a selecting member 160a2 which is provided around the moving member 160a1 and through which the function of the moving member 160a1 is selected. The hall mouse 160a is disposed in the center of the left panel part 114 so as to approach the user's thumb without difficulty. Alternatively, the hall mouse 160a may be provided elsewhere, such as in the right part 115 of the front panel surface 113.

The mouse function key 160b may be provided in the right part 115 of the front panel 113 to be operated when the mouse function is selected through the mouse 160a. The mouse function key 160b has a left mouse function key 160b1 and a right mouse function key 160b2.

The left mouse function key 160b1 performs a click function in the position where the pointer, etc. of the display is positioned according to the movement of the hall mouse 160a.

The right mouse function key 160b2 performs the function popping up a predetermined function in the position where the pointer, etc of the display is positioned. For example, if the right mouse function key 160b2 is pressed, a block for selecting the function such as 'copy', 'paste', 'paragraph', etc. pops up corresponding to the position of the pointer of the display. Accordingly, the user may select a predetermined function in the popped up block.

Alternatively, the mouse function key 160b may be provided elsewhere, such as in the left part 114 of the front panel 113 as desired.

The function setting key 160c may be disposed in the right part 115 of the front panel 113. The user may set his or her wanted function using the function setting key 160c. The function setting key 160c includes an enter key 160c1 provided in the center of the function setting key 160c, and a function setting member 160c2 which is provided around the enter key 160c1 so as for the user to selectively set the wanted function. In this example, the function setting member 160c2 may allow four functions (U1 to U4 in FIG. 4) to be set.

In this example, the function setting key 160c is disposed in the center of the right panel part 115 in consideration of the movement of the thumb in the state that the user holds the main body 110. Alternatively, the function setting key 160c may be disposed elsewhere, such as in the left part 114 of the front panel surface 113 as desired.

The sizes of the hall mouse 160a, the mouse function key 160b, and the function setting key 160c may be designed in consideration of the sizes of the display unit 120, the left panel part 114, the right panel part 115, etc.

Accordingly, the user may conveniently use the portable computer 100 while holding the main body 110 because the function input unit 160 can be easily accessed in the front panel 113.

The controller 180 may include a central processing unit 181 to recognize, operate on and/or determine the information, the data, etc. input with the input unit 191 and an output processing unit 183 provided to output information, etc. processed in the central processing unit 181.

The input unit 191 is provided in the main body 110 and may transmit the information and the data to the controller 180 of the main body 110 and/or to the storing unit 187 by various methods. The input unit 191 in this example includes the key input unit 130, the additional input unit 150, and the function input unit 160 as described above. The input unit 191 may further include other known input systems as well if desired.

The information, etc. input through the input unit 191 is processed by the controller 180 and is output by the output unit 193. The output unit 193 in this example includes the display unit 120 and the speakers 170a and 170b. The main body 110 may also include a terminal to allow connection to a printer, etc. to output the information, etc. The output unit 193 may further include a small display unit (not shown), etc. to display a 'power on' state, etc. to the user in addition to the display unit 120.

The storing unit 187 stores the information processed in the controller 180 and/or input through the input unit 191. The information, etc. stored in the storing unit 187 may be used by the controller 180 if necessary.

A power supplying unit 195 supplies power to the display unit 120, the speaker 170, the controller 180, etc.

The contact part 211 is a region of the key 139 which the pressing unit P contacts. The contact part 211 has a shape protruding upward. The contact part 211 may have various cross sections such as a polygonal section.

The non-contact part 213 of the key 139 extends from the contact part 211. The non-contact part 213 of a key 139 is positioned between the contact parts 211 of the adjacent keys 139 in the X direction. The non-contact part 213 may have a height lower than the contact parts 211 of the adjacent keys 139. Preferably, the height of the non-contact part 213 is lower than the contact parts 211 of neighboring keys when these neighboring keys are depressed by the pressing unit P. The non-contact part 213 may have a shape recessed downward. The non-contact part 213 may have various cross sections such as a polygonal cross section.

Figure 6:
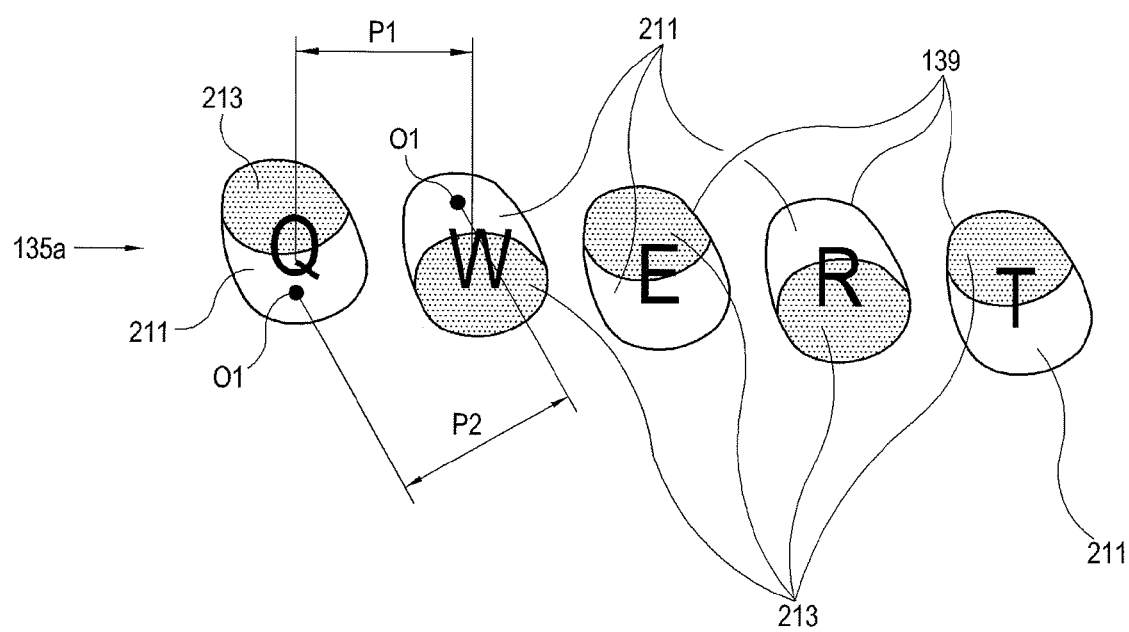
FIG. 6 is an enlarged plan view of a horizontal key group in FIG. 4.

As illustrated in FIGS. 4 and 6, the contact parts 211 and the non-contact parts 213 are alternately arranged in a direction along the extension line 121b corresponding to the horizontal key group 135 or 145. More specifically, the upper part of a "Q" key 139 is the non-contact part 213 and the lower part of the "Q" key 139 is the contact part 211, and the upper part of a "W" key 139 disposed in the right side of the "Q" key 139 is the contact part 211 and the lower part of the "W" key 139 is the non-contact part 213. Thus, along the top of the keys constituting horizontal key group 135a, the contact parts 211 and non-contact parts 213 are alternately arranged (e.g., non-contact part for the "Q" key, contact part for the "W" key, non-contact part for the "E" key, etc.). Similarly, along the bottom of the keys constituting horizontal key group 135a, the contact parts 211 and non-contact parts 213 are alternately arranged (e.g., contact part for the "Q" key, non-contact part for the "W" key, contact part for the "E" key, etc.)

Alternatively, the contact part 211 and the non-contact part 213 may be arranged in other ways. For example, the non-contact parts 213 of the neighboring "Q" and "W" keys 139 (refer to FIG. 4) may be disposed in the upper part thereof, respectively; the non-contact parts 213 of the next "E" and "R" keys 139 may be disposed in the lower part thereof, respectively; and then the non-contact part 213 of the next "T" key 139 may be disposed in the upper part thereof. Alternatively, the non-contact part 213 of the "Q" key 139 may be disposed in the upper part thereof; the non-contact parts 213 of the next "W" and "E" keys 139 may be disposed in the lower part thereof; and the non-contact parts 213 of the next "R" and "T" keys 139 may be disposed in the upper part thereof.

Also, the contact parts 211 and the non-contact parts 213 may be alternately disposed along the column direction in addition to or alternatively to the row. That is, the contact parts 211 and the non-contact parts 213 may be alternately disposed along the row direction (the "X" axis in FIG. 2 or in a direction to the side of the display opening 111 from the outside of the front panel 113). Also or alternatively, the contact parts 211 and the non-contact parts 213 may be alternately disposed along the column direction (the "Y" axis in FIG. 2 or in a direction to the lower part from the upper part of the front panel 113).

Figure 5A:
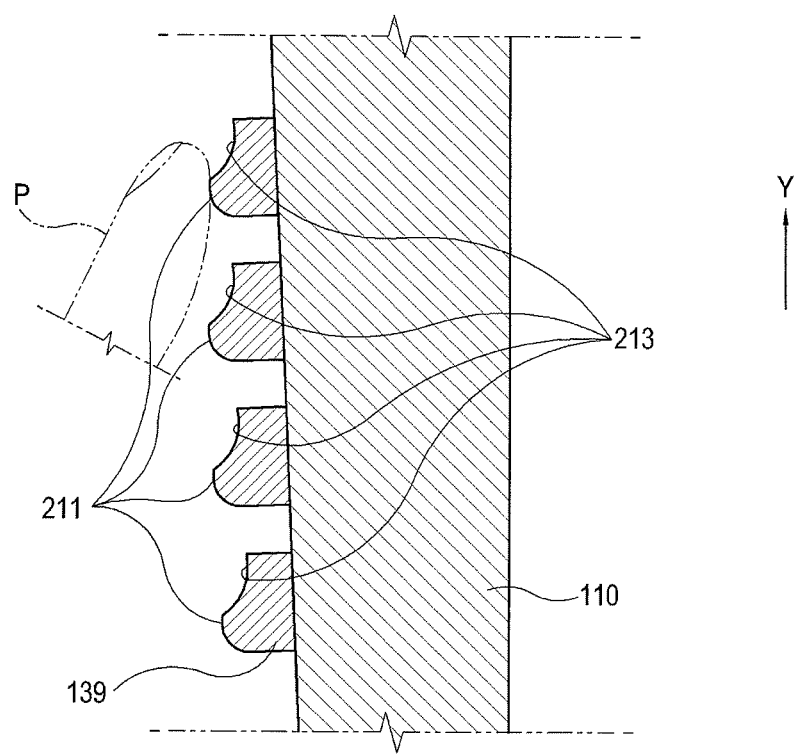
FIGS. 5A and 5B are sectional views, taken along lines Va-Va and Vb-Vb in FIG. 4.
Figure 5B:
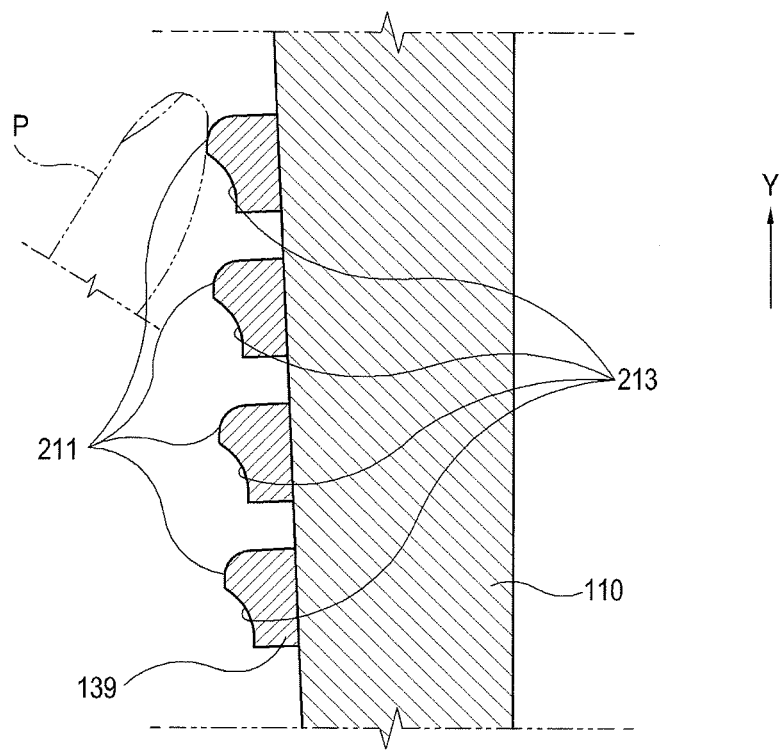

Also, it is preferable but not necessary that the non-contact parts 213 and the contact parts 211 may include the same or similar (e.g., substantially symmetrical) zigzag patterns in the respective horizontal key groups 135 and 145. That is, as illustrated in FIG. 4, the respective horizontal key groups 135a through 135e may be arranged so that the non-contact part 213 of the leftmost key 139 is disposed in the upper part thereof and the non-contact part 213 of the rightmost key 130 is disposed in the upper part thereof. FIGS. 5A and 5B illustrate sectional views respectively taken along Va-Va and Vb-Vb in the Y direction in FIG. 4. FIG. 5A illustrates the cross-sectional profile, with the upper part of the "I" key 139 (the uppermost key in FIG. 5A) being the non-contact part 213 and the lower part of the "I" key 139 being the contact part 211. Also, the upper part of the "K" key 139 (the second uppermost key in FIG. 5A) disposed under the "I" key 139 is the non-contact part 213 and the lower part of the "K" key 139 is the contact part 211. The cross sectional profile of the neighboring column of keys 139 is illustrated in FIG. 5B with the upper part of the "O" key 139 (the uppermost key in FIG. 5B) being the contact part 211 and the lower part of the "O" key 139 being the non-contact part 213. Also, the upper part of the "L" key 139 (the second uppermost key in FIG. 5B) disposed under the "O" key 139 is the contact part 211 and the lower part of the "L" key 139 is the non-contact part 213. Of course, this arrangement may be changed, for example to the opposite of this exemplary embodiment.

The pitch between the pressing portion of the keys 139 having the above arrangement can be effectively extended while still providing a familiar key pattern. Accordingly, the space efficiency is improved and thus, the slim appearance can be accomplished.

For example, assuming that the display unit 120 has a size of seven inches, and referring to FIG. 6, a pitch P1 between the keys 139 in the horizontal key groups 135 and 145 may be 5 mm, but a pitch P2 between the center 01 of the contact part 211 of the "Q" key 139 and the center 01 of the contact part 211 of the "W" key 139 may be 6.2 mm. That is, the pitch P2 of the contact part 211 is larger than the pitch P1 of the key 139 by about 24%.

Also, the user can recognize the protruded contact part 211 and the recessed non-contact part 213 without difficulty, and easily identify the position of the keys 139.

Also, in the state that the pressing unit P presses the contact part 211 of one of the keys 139, the pressing unit P does not press the other key 139 arranged adjacent to the pressed key 139. Accordingly, input errors by the user can be prevented, minimized and/or reduced.

The pressing unit P may press the contact part 211 to operate the key 139 and allow the information to be inputted according to the function given to the pressed key 139. The pressing unit P may be the user's fingers, or may include the other known structure such as a pen.

An operating process according to another embodiment of the present general inventive concept will be described with reference to FIGS. 8B and 9 as follows. The operating process will be described with respect to the portable computer 100 having the configuration described above but is not limited thereto.

The user holds the main body 110 of the portable computer 100 using his or her right hand and left hand. That is, the palms of the right and left hands are respectively contacted to the lower end part of the right and left parts of the front panel 113, and the respective four fingers except the thumb hold the rear part of the main body 110. At this time, if the four fingers except the thumb hold the supporting bracket 119 of the rear part of the main body 110, the main body 110 may be held more stably.

Figure 8A:
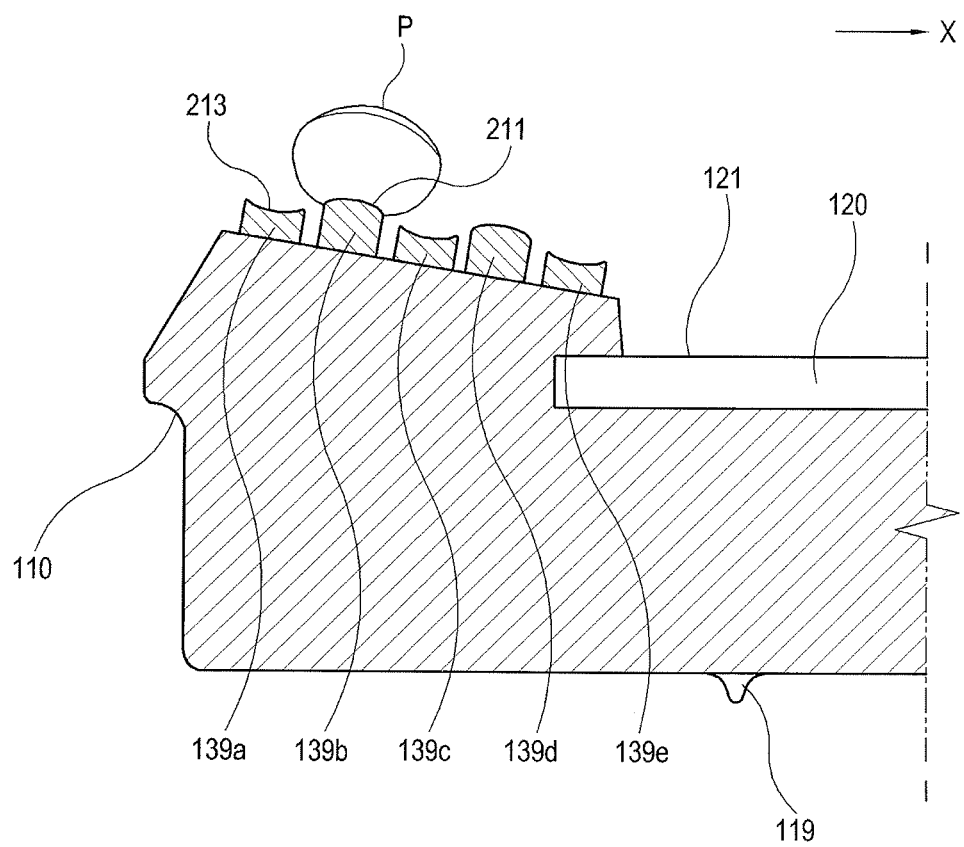
FIGS. 8A and 8B are sectional views, taken along line VIII-VIII in FIG. 4.

As illustrated in FIG. 8A, the user puts the thumb which is the pressing unit P on the contact part 211 of the key 139 which the user wants to press.

Figure 8B:
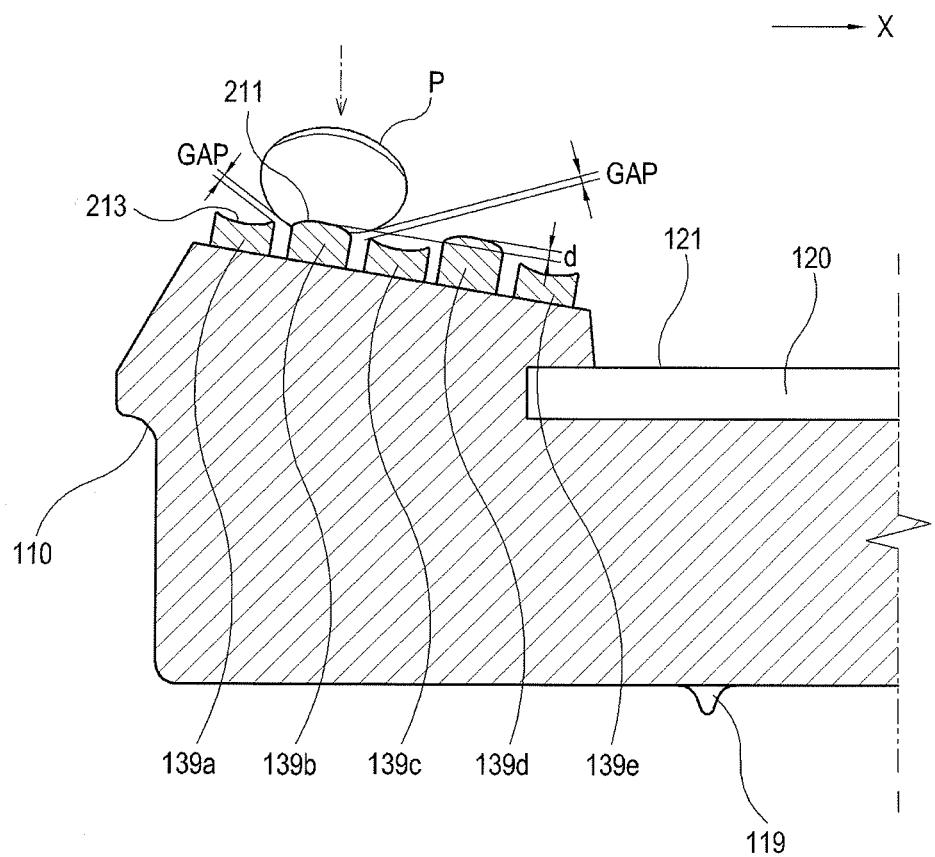

Next, if the user presses the contact part 211 of the key 139b using the pressing unit P, as illustrated in FIG. 8B, the key 139b is moved down at a predetermined distance d and inputs predetermined information to the controller 180. At this time, the pressing unit P may be spaced apart from the non-contact part 213 of the neighboring keys 139a and 139c (refer to "GAP" in FIG. 8B). Accordingly, in the process that the user inputs the information through the key 139a, the other keys 139b and 139c may be not pressed or contacted. Also, if the contact parts 211 are alternately arranged in a zigzag pattern, as described above, this effect may be enhanced.

Figure 9:
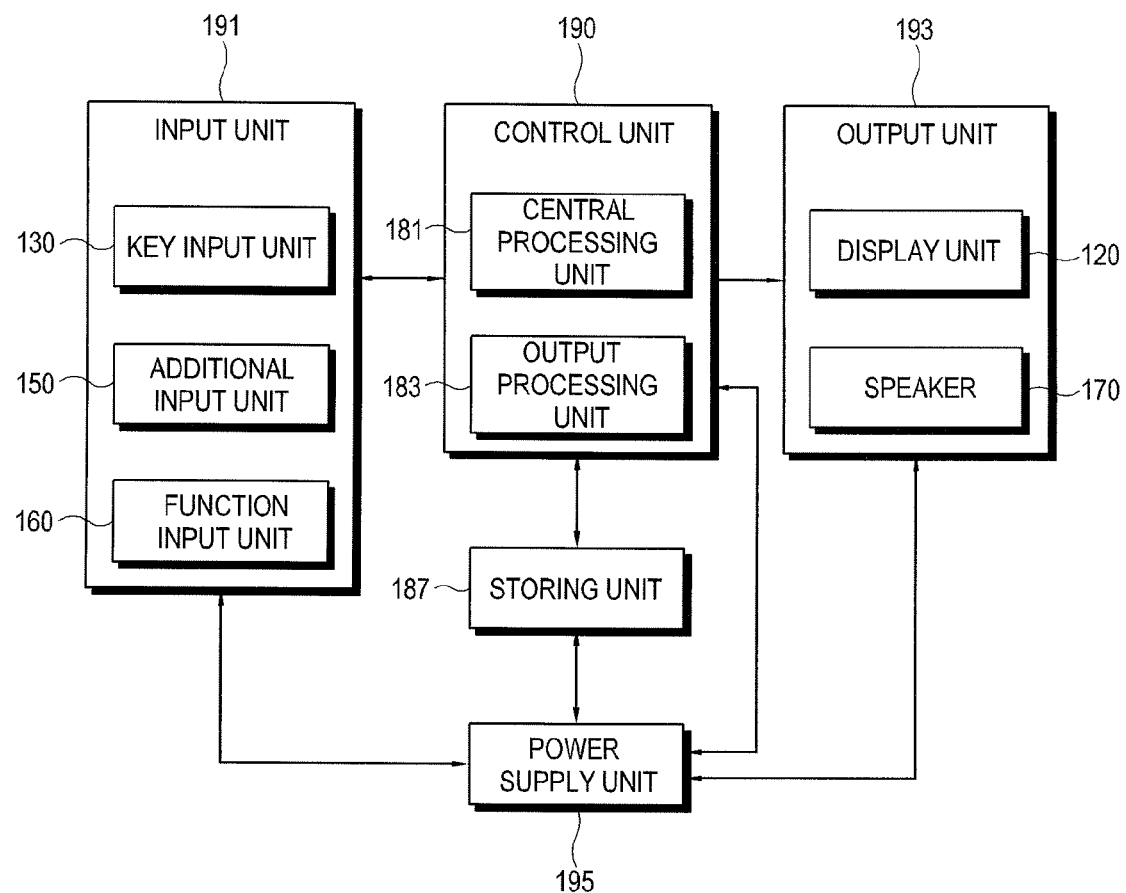
FIG. 9 is a block diagram illustrating another embodiment which may be used with the input device in FIG. 1.

As illustrated in FIG. 9, the information input through the key input unit 130, the additional input unit 150, and the function input unit 160 may be recognized, determined, compared, etc. in the central processing unit 181, may be stored in the storing unit 187, and output as an image on the display unit 120 or as a sound through the output unit 193 such as the speakers 170a and 170b via the output processing unit 183.

As described above, an input device and an electronic apparatus having the same which can prevent and/or reduce erroneous input by a user as well as enhance the convenience to the user.

Further, there is provided an input device and an electronic apparatus having the same which can which can minimize or reduce a user's movement during input.

Furthermore, there is provided an input device and an electronic apparatus having the same which can realize a slim appearance.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An input device comprising:
   a main body; and
   a plurality of keys each comprising a contact part adapted to contact a pressing unit and a non-contact part which extends from the contact part and is spaced apart from the pressing unit,
   wherein the plurality of keys comprises a first series of keys each center of which exists on substantially a first line, each of the first series of keys comprising the contact part and the non-contact part arranged substantially in an upper part and a lower part with the first line therebetween, and such that when the contact part of one key of the first series of keys is disposed substantially in the upper part with respect to the first line, the contact part of each key adjacent to the one key of the first series of keys along the first line is disposed substantially in the lower part with respect to the first line.

2. The input device according to claim 1, wherein the plurality of keys are arranged in a row, and
   a contact part of one key is adjacent to non-contact parts of each adjacent key in the row and the non-contact part of the one key is adjacent to contact parts of each adjacent key in the row.

3. The input device according to claim 1, wherein the plurality of keys are arranged in a column, and
   a contact part of one key is adjacent to non-contact parts of each adjacent key in the column and the non-contact part of the one key is adjacent to contact parts of each adjacent key in the column.

4. The input device according to claim 1, wherein the contact part comprises a protruded shape, and the non-contact part comprises a recessed shape.

5. The input device according to claim 1, wherein the contact part of the key adapted to be pressed by the pressing unit has an average height greater than the average heights of the non-contact part of the neighboring keys disposed adjacent thereto.

6. The input device according to claim 1, wherein the plurality of keys make up a key input unit disposed in the main body and are arranged in at least one row.

7. The input device according to claim 1, wherein the plurality of keys further comprises a second series of keys each center of which exists on substantially a second line spaced apart from the first line, and
   a first angle between the first line and a lengthwise direction of the main body is different from a second angle between the second line and the lengthwise direction of the main body.

8. The input device according to claim 7, wherein the first angle is greater than the second angle.

9. The input device according to claim 7, wherein the plurality of keys further comprises a third series of keys each center of which exists on substantially a third line spaced apart from the first and second lines, and the first angle between the first line and the lengthwise direction of the main body is different from a third angle between the third line and the lengthwise direction of the main body.

10. An electronic apparatus comprising:
    an input device including a main body, and a plurality of keys each comprising a contact part adapted to contact a pressing unit and a non-contact part which extends from the contact part and is spaced apart from the pressing unit; and
    a display device provided in the main body,
    wherein the plurality of keys comprises a first series of keys each center of which exists on substantially a first line, each of the first series of keys comprising the contact part and the non-contact part arranged substantially in an upper part and a lower part with the first line therebetween, and if the contact part of one key of the first series of keys is disposed substantially in the upper part with respect to the first line, the contact part of the key adjacent to the one key of the first series of keys along the first line is disposed substantially in the lower part with respect to the first line.

11. The electronic apparatus according to claim 10, wherein the plurality of keys are located on at least one side of the display device.

12. The electronic apparatus according to claim 11, wherein the plurality of keys are divided into a first panel part located on a first side of the display part and a second panel part located on a second side of the display part opposite the first side.

13. The electronic apparatus according to claim 11, wherein the plurality of keys are arranged in at least one row in a direction of the first line,
    the display part is a substantially flat plane, and
    the plurality of keys are arranged at an angle with respect to the display part, such that a key at an end of each row closest to the display part is closer to a surface of the substantially flat plane than a key at an end of each row farthest from the display part.

14. An input device comprising:

a plurality of keys arranged in at least one row, each key adapted to receive a force on a respective upper pressing surface to input information when a component of the force along a first direction exceeds a certain level, wherein the plurality of keys comprises a first series of keys each center of which exists on substantially a first line, each of the first series of keys comprising the contact part and the non-contact part arranged substantially in an upper part and a lower part with the first line therebetween, and if the contact part of one key of the first series of keys is disposed substantially in the upper part with respect to the first line, the contact part of the key adjacent to the one key of the first series of keys along the first line is disposed substantially in the lower part with respect to the first line.

15. An input device comprising:

a plurality of keys arranged in at least one row, each key adapted to be pressed to input data when a force component received along a first direction exceeds a certain level, wherein with respect to a top down view of each key in the first direction to an arranged surface of the keys, each key includes a top surface comprising first and second surfaces on opposite sides of a line intersecting a center of the key's top surface and extending in the row direction, an average height in the first direction of the first surface is different from an average height in the first direction of the second surface, an average height of the first surface of a first key in the at least one row is higher than an average height of the first surfaces of keys immediately adjacent to the first key in the same row, and an average height of the second surfaces of the keys immediately adjacent to the first key are higher than an average height of the second surface of the first key.

16. An input device comprising:

a plurality of keys arranged in at least one row, each key including an upper surface, wherein a majority part of the upper surface is shaped substantially as a stair in each key, the stair including an upper part of the stair being a first surface and a lower part of the stair being a second surface, wherein an average height of the first surface of a first key in the at least one row is at a different height than an average height of the first surfaces of keys immediately adjacent to the first key in the same row, and an average height of the second surfaces of the keys in the at least one row immediately adjacent to the first key in the same row are at a different height than an average height of the second surface of the first key.

17. The input device of claim 16, wherein the upper part of the stair includes a convex surface, and the lower part of the stair includes a concave surface.

* * * * *